July 11, 1950　　　　　　　　E. STRONG　　　　　　　2,514,910
CHICKEN FEEDER
Filed Oct. 27, 1947　　　　　　　　　　　　　　2 Sheets-Sheet 2
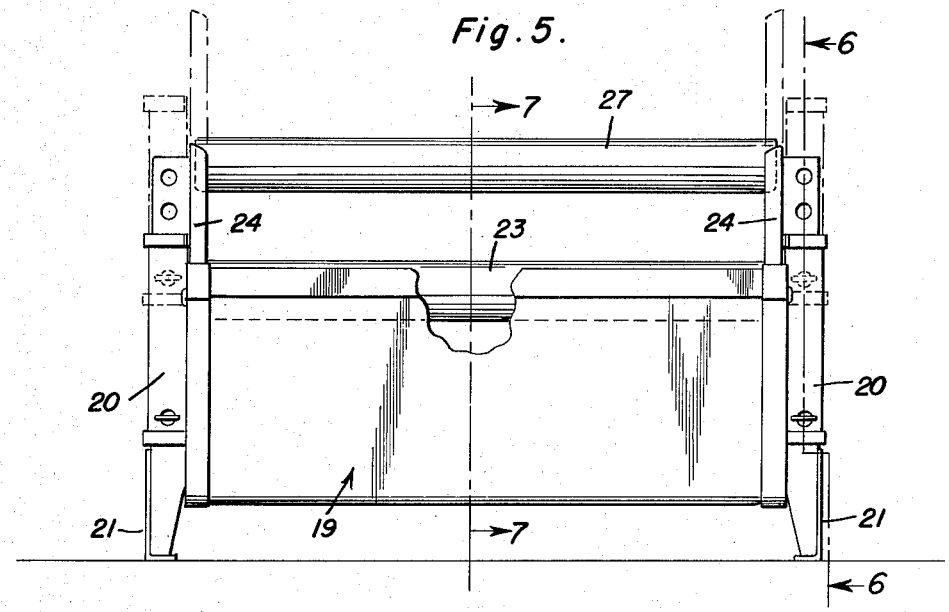
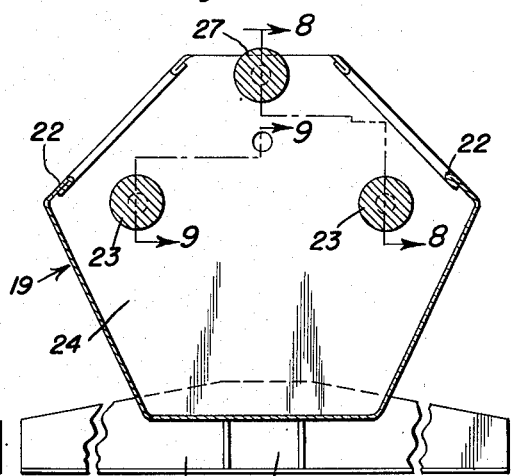
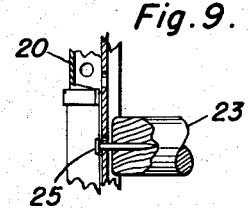
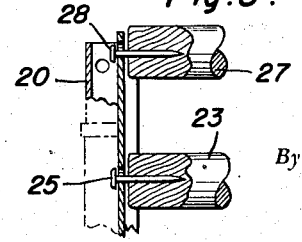
Inventor
Elmer Strong
By Clarence A. O'Brien
and Harvey B. Jacobson
Attorneys Patented July 11, 1950

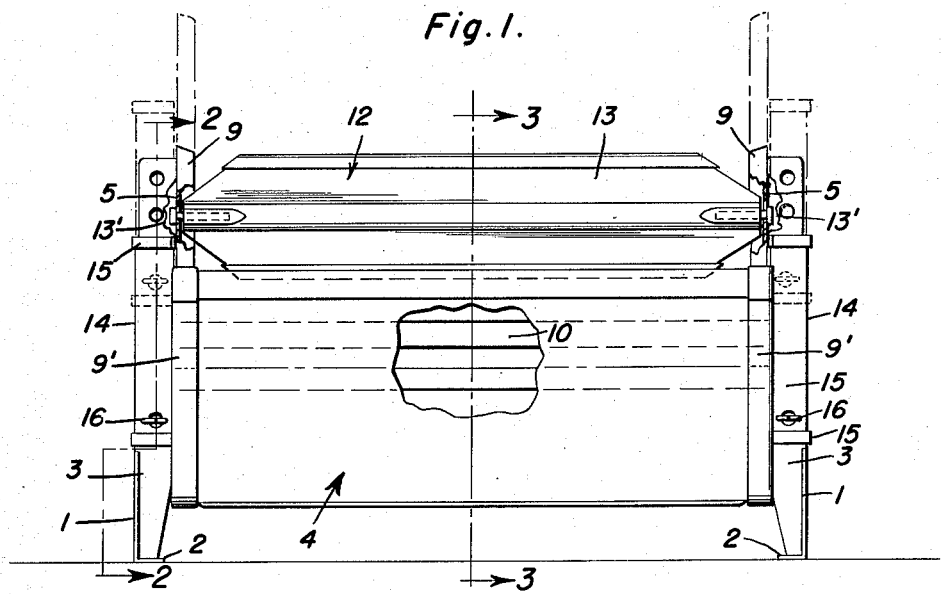

2,514,910

UNITED STATES PATENT OFFICE 2,514,910

CHICKEN FEEDER

Elmer Strong, Springfield, Mo.

Application October 27, 1947, Serial No. 782,322

1 Claim. (Cl. 119—61)

My invention relates to improvements in chicken feeders, the primary object in view being to provide a chicken feeder of the trough type especially adapted to prevent the chickens from wasting food by throwing the same out of the trough when eating, and which is designed for easy, quick adjustment as to height for access thereto by chickens of different sizes, is simple in construction, strong and durable, and inexpensive to manufacture.

Other and subordinate objects, within the purview of my invention, together with the precise nature of my improvements will be readily understood when the succeeding description and claim are read with reference to the drawings accompanying and forming part of this specification.

In said drawings:

Figure 1 is a view in side elevation, partly broken away and shown in section, of a preferred embodiment of my improved chicken feeder;

Figure 2 is a view in vertical transverse section taken on the irregular line 2—2 of Figure 1;

Figure 3 is a view in transverse section taken on the line 3—3 of Figure 1;

Figure 4 is a fragmentary view in longitudinal section taken on the line 4—4 of Figure 3;

Figure 5 is a view in side elevation, partly broken away, of a modified embodiment of my improved feeder;

Figure 6 is a view in vertical transverse section taken on the line 6—6 of Figure 5;

Figure 7 is a similar view taken on the line 7—7 of Figure 5;

Figure 8 is a fragmentary view in vertical longitudinal section taken on the line 8—8 of Figure 7; and Figure 9 is a similar view taken on the line 9—9 of Figure 7.

Referring to the drawings by numerals, and first to Figures 1 to 4 thereof, in the preferred embodiment, my feeder comprises a pair of transverse, parallel, end base bars 1 of angle iron shape in cross-section, of any suitable material, with bottom flanges 2 for resting on the ground or the like.

A pair of channel iron type posts 3 arise from the base bars 1, in the transverse center thereof, with channel sides facing and lower ends suitably secured in said bars 1 in a manner not shown.

A feed trough 4 is mounted, as presently described, on said posts 3 for vertical sliding adjustment between the same to vary the height thereof from the base bars 1.

The feed trough 4 comprises hexagonal metal ends 5, and a flat bottom 6 and sides 7 formed in one piece of metal and suitably secured to said ends 5 so that the sides 7 flare upwardly to substantially half the height of said ends 5. The sides 7 terminate in upper, inwardly projecting, edge reinforcing flanges 88 and the ends 5 are provided with inturned reinforcing flanges 9. Corner cap strips 9' are suitably secured to the ends of said trough 4, for sealing purposes.

A pair of guard rails 10 extend along opposite sides 7 inside the trough 4 adjacent to and below the flanges 8 and project further inwardly of the trough 4 than said flanges. The guard rails 10 incline inwardly and upwardly from the sides 7 and are of right-angled form and secured to said sides 7 with lugs 11 thereon secured to the ends 5 as by welding, not shown.

A rotary guard of elongated form and designated 12, with longitudinal blades 13, extend horizontally between the ends 5 in the vertical center of the trough 4 and above the guard rails 10. The rotary guard 12 is rotatably mounted in the ends 5 of the trough 4 by means of pins 13' extending through said ends 5 and into the ends of said guard. The rotary guard 12 is thus rotatably mounted to prevent chickens from roosting on the same and fouling the food in the trough 4.

The trough 4 is mounted on the posts 3 by means of vertically elongated, channel guides 14 straddling the posts 3 and vertically slidable thereon with vertical side flanges 15 suitably secured, as by welding, not shown, to said ends 5, and bent over reinforcing end edges 15 formed on said guides 14 as best shown in Figure 4. Cotter pins, as at 16, are inserted through the side openings 17 in the guides 14 and through selective, vertically spaced pairs of openings 18 in the sides of the posts 3, whereby said trough 4 is adapted to be held in selected vertically adjusted position.

In using the described embodiment of my improved chicken feeder, the trough 4 is adjusted, on the posts 3, in the manner already described and as shown in dotted lines in Figures 1 and 5 to vary the height of said trough according to the size and type of chickens to be fed. The trough 4 is filled to substantially the level of the guard rails 10 with chicken feed. This necessitates the chickens feeding upon opposite sides of the trough 4 between said guard rails 10 and the rotary guard 12 which prevents the chickens from throwing the feed upwardly and out of the trough by pecking at the food and abrupt raising of their heads out of the trough, the rotary guard 12 preventing such abrupt raising of the heads of the chickens in a manner which will be clear.

In the modified embodiment of the feeder shown in Figures 5, 6 and 7, the trough 19 is constructed and mounted on posts 20 upstanding from base bars 21 just as described with reference to the preferred embodiment, and said trough 19 is provided with inwardly projecting, upper edge, reinforcing flanges 22 corresponding to the flanges 8. However, in lieu of the guard rails 10 of the preferred embodiment of my invention, a pair of longitudinally extending rollers 23 are journalled at ends thereof in the ends 24 of the trough 19 by pins 25, and which are disposed adjacent opposite sides 26 of said trough 19 parallel with said sides and adjacent to the flanges 22 substantially level therewith. A similar longitudinally extending roller 27 is mounted by pins 28 in the ends 24 of said trough in the longitudinal center of the trough and at the top thereof. The rollers 23, 27 function in a manner similar to the guard rails 10 and rotary guard of the preferred embodiment of the invention. However, the rollers 23 by rotating prevents chafing and injury to the necks and heads of chickens inserting their heads between the same and the roller 27, while the roller 27 positively obviates cutting of chickens' heads contacting said roller in withdrawing or raising their heads from the trough 19. In this embodiment of my invention, the trough 19 is filled with chicken feed to a level below the bottom of the rollers 23 to keep said rollers free for rotation.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claim.

Having described the invention what is claimed as new is:

In a chicken feeder, a pair of base bars, a pair of posts upstanding from said base bars, a feed trough having ends and sides lower than said ends, a pair of longitudinal guard members in said trough extending along opposite sides thereof for preventing feed from being thrown upwardly out of the trough by chickens raising their heads abruptly upwardly in the trough, a longitudinal guard member in said trough above said pair and in the median plane of said trough tending to prevent chickens feeding in the trough from raising their heads abruptly and rotatably mounted on the ends of the trough to prevent chickens from roosting on the same, and means for mounting the trough on said posts for vertical adjustment in accordance with different sizes of chickens feeding from said trough, said guard members comprising rollers respectively.

ELMER STRONG.

REFERENCES CITED

The following references are of record in the file of this patent:

UNITED STATES PATENTS

| Number | Name | Date |
| --- | --- | --- |
| 1,864,569 | Willauer | June 28, 1932 |
| 2,130,048 | Waite | Sept. 13, 1938 |
| 2,308,701 | Martin | Jan. 19, 1943 |